US012670722B2

(12) United States Patent
Bao et al.

(10) Patent No.: US 12,670,722 B2
(45) Date of Patent: Jun. 30, 2026

(54) SELF-SUPERVISED COMPOSITIONAL FEATURE REPRESENTATION FOR VIDEO UNDERSTANDING

(71) Applicants: TOYOTA RESEARCH INSTITUTE, INC., Los Altos, CA (US); THE REGENTS OF THE UNIVERSITY OF CALIFORNIA, Oakland, CA (US); THE BOARD OF TRUSTEES OF THE UNIVERSITY OF ILLINOIS, Urbana, IL (US); CARNEGIE MELLON UNIVERSITY, Pittsburgh, PA (US)

(72) Inventors: Zhipeng Bao, Pittsburgh, PA (US); Pavel Tokmakov, Santa Monica, CA (US); Adrien David Gaidon, San Jose, CA (US); Allan Jabri, Toronto (CA); Yuxiong Wang, Champaign, IL (US); Martial Hebert, Pittsburgh, PA (US)

(73) Assignees: TOYOTA RESEARCH INSTITUTE, INC.; TOYOTA JIDOSHA KABUSHIKI KAISHA, Aichi-Ken (JP); THE REGENTS OF THE UNIVERSITY OF CALIFORNIA; THE BOARD OF TRUSTEES OF THE UNIVERSITY OF ILLINOIS; CARNEGIE MELLON UNIVERSITY

( * ) Notice: Subject to any disclaimer, the term of this patent is extended or adjusted under 35 U.S.C. 154(b) by 437 days.

(21) Appl. No.: 18/077,974

(22) Filed: Dec. 8, 2022

(65) Prior Publication Data

US 2023/0252796 A1     Aug. 10, 2023

Related U.S. Application Data

(60) Provisional application No. 63/288,463, filed on Dec. 10, 2021.

(51) Int. Cl.
| | | |
|---|---|---|
| *G06V 20/58* | (2022.01) | |
| *G06T 7/215* | (2017.01) | |

(Continued)

(52) U.S. Cl.
CPC .............. *G06V 20/58* (2022.01); *G06T 7/215* (2017.01); *G06T 7/246* (2017.01);

(Continued)

(58) Field of Classification Search
CPC .............. G06V 20/58; G06V 10/7715; G06V 10/7753; G06V 10/454; G06V 20/46;

(Continued)

(56) References Cited

U.S. PATENT DOCUMENTS

| | | | |
|---|---|---|---|
| 8,903,128 B2 | 12/2014 | Shet et al. | |
| 9,454,819 B1 * | 9/2016 | Seetharaman | ....... G06V 10/764 |

(Continued)

FOREIGN PATENT DOCUMENTS

| | | |
|---|---|---|
| CN | 111860485 A | 10/2020 |
| CN | 113012254 A | 6/2021 |

(Continued)

OTHER PUBLICATIONS

Yang, Charig et al. "Self-supervised Video Object Segmentation by Motion Grouping", Oct. 17, 2021 [retrieved on Feb. 28, 2025], 2021 IEEE/CVF International Conference on Computer Vision (ICCV), Montreal, QC, Canada, 2021, pp. 7157-7168. (Year: 2021) Retrieved from IEEE Xplore: <URL: https://ieeexplore.ieee.org/document/9711323>. <DOI: 10.1109/ICCV48922.2021.00709>. (Year: 2021).*

(Continued)

*Primary Examiner* — Matthew C Bella
*Assistant Examiner* — Nichols John Helco
(74) *Attorney, Agent, or Firm* — SEYFARTH SHAW LLP

(57) ABSTRACT

A method of compositional feature representation learning for video understanding is described. The method includes (Continued)

individually processing a sequence of video frames received as an input of a feature map network to generate a plurality of feature maps. The method also includes binding the plurality of feature maps to a fixed set of slot variables using an attention model according to a motion segmentation signal. The method further includes combining slot states corresponding to the fixed set of slot variables into a combined feature map. The method also includes decoding the combined feature map to form a reconstructed sequence of video frames, in which objects discovered in the reconstructed sequence of video frames are identified.

15 Claims, 8 Drawing Sheets

(51) Int. Cl.
 G06T 7/246 (2017.01)
 G06V 10/77 (2022.01)
 G06V 10/774 (2022.01)

(52) U.S. Cl.
 CPC ...... G06V 10/7715 (2022.01); G06V 10/7753 (2022.01); G06T 2207/10016 (2013.01); G06T 2207/20081 (2013.01); G06T 2207/20084 (2013.01); G06T 2207/30252 (2013.01)

(58) Field of Classification Search
 CPC ...... G06V 10/82; G06V 20/647; G06V 20/70; G06V 10/26; G06V 10/70; G06V 10/86; G06V 10/7792; G06V 10/80; G06V 10/803; G06V 10/806; G06V 10/809; G06V 20/49; G06V 20/56; G06V 20/588; G06T 7/215; G06T 7/246; G06T 2207/10016; G06T 2207/20081; G06T 2207/20084; G06T 2207/30252; G06T 7/10; G06T 7/11; G06T 7/174; G06T 7/194; G06T 2207/10021; G06T 2207/20112; G06T 2207/20221; G06T 2207/30261; G06T 2210/12; G05B 2219/33025; G06N 3/044; G06N 3/045; G06N 3/0455; G06N 3/0464; G06N 3/088; G06N 3/0895
 See application file for complete search history.

(56) References Cited

U.S. PATENT DOCUMENTS

| | | | | |
|---|---|---|---|---|
| 11,816,533 | B2 * | 11/2023 | Ren | G06N 3/0895 |
| 12,067,785 | B2 * | 8/2024 | Ambrus | G06F 18/2155 |
| 2015/0317519 | A1 * | 11/2015 | Gurbuz | G06T 7/254 |
| | | | | 382/103 |
| 2020/0394458 | A1 | 12/2020 | Yu et al. | |
| 2021/0319242 | A1 * | 10/2021 | Cholakkal | G06V 20/52 |
| 2021/0374416 | A1 * | 12/2021 | Zablotskaia | G06N 7/01 |
| 2021/0383199 | A1 * | 12/2021 | Weissenborn | G06N 3/09 |
| 2021/0390710 | A1 * | 12/2021 | Zhang | G11B 27/28 |
| 2021/0406560 | A1 * | 12/2021 | Park | G01S 13/862 |
| 2023/0123899 | A1 * | 4/2023 | Iqbal | G06V 20/58 |
| | | | | 382/154 |
| 2023/0154198 | A1 * | 5/2023 | Makansi | G06V 20/58 |
| | | | | 382/103 |

FOREIGN PATENT DOCUMENTS

| | | |
|---|---|---|
| CN | 113204010 A | 8/2021 |
| WO | 2021165569 A1 | 8/2021 |

OTHER PUBLICATIONS

Yang, Charig et al. "Self-supervised Video Object Segmentation by Motion Grouping", Oct. 17, 2021, 2021 IEEE/CVF International Conference on Computer Vision (ICCV), Montreal, QC, Canada, 2021, pp. 7157-7168. Retrieved from IEEE Xplore: <URL: https://ieeexplore.ieee.org/document/9711323> (Year: 2021).*
Jabri, et al., "Space-Time Correspondence as a Contrastive Random Walk", arXiv:2006.14613v2, Dec. 3, 2020.
Wang, et al., "Removing the Background by Adding the Background: Towards Background Robust Self-supervised Video Representation Learning", arXiv:2009.05769v4, Apr. 22, 2021.

* cited by examiner

530 Detection

540 Segmentation

550 Tracking

Feature Embedding

520

Video Understanding

510

502

500

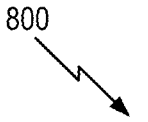

800

802

INDIVIDUALLY PROCESS A SEQUENCE OF VIDEO FRAMES RECEIVED AS AN INPUT OF A FEATURE MAP NETWORK TO GENERATE A PLURALITY OF FEATURE MAPS

804

BIND THE PLURALITY OF FEATURE MAPS TO A FIXED SET OF SLOT VARIABLES USING AN ATTENTION MODEL ACCORDING TO A MOTION SEGMENTATION SIGNAL

806

COMBINE SLOT STATES CORRESPONDING TO THE FIXED SET OF SLOT VARIABLES INTO A COMBINED FEATURE MAP

808

DECODE THE COMBINED FEATURE MAP TO FORM A RECONSTRUCTED SEQUENCE OF VIDEO FRAMES, IN WHICH OBJECTS DISCOVERED IN THE RECONSTRUCTED SEQUENCE OF VIDEO FRAMES ARE IDENTIFIED

*FIG. 8*

SELF-SUPERVISED COMPOSITIONAL FEATURE REPRESENTATION FOR VIDEO UNDERSTANDING

CROSS-REFERENCE TO RELATED APPLICATION

The present application claims the benefit of U.S. Provisional Patent Application No. 63/288,463, filed Dec. 10, 2021, and titled "SELF-SUPERVISED COMPOSITIONAL FEATURE REPRESENTATION FOR VIDEO UNDERSTANDING," the disclosure of which is expressly incorporated by reference herein in its entirety.

BACKGROUND

Field

Certain aspects of the present disclosure generally relate to machine learning and, more particularly, a system and method for self-supervised compositional feature representation for video understanding.

Background

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

Autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be in communication with a device, such as an autonomous vehicle for collecting unlabeled 3D data.

Although this unlabeled 3D data is easy to collect, state-of-the-art machine learning techniques for 3D object detection still rely on difficult-to-obtain manual annotations. To reduce this dependence on the expensive and error-prone process of manual labeling, a technique for self-supervised compositional feature representation for video understanding is desired.

SUMMARY

A method of compositional feature representation learning for video understanding is described. The method includes individually processing a sequence of video frames received as an input of a feature map network to generate a plurality of feature maps. The method also includes binding the plurality of feature maps to a fixed set of slot variables using an attention model according to a motion segmentation signal. The method further includes combining slot states corresponding to the fixed set of slot variables into a combined feature map. The method also includes decoding the combined feature map to form a reconstructed sequence of video frames, in which objects discovered in the reconstructed sequence of video frames are identified.

A non-transitory computer-readable medium having program code recorded thereon of compositional feature representation learning for video understanding is described. The program code is executed by a processor. The non-transitory computer-readable medium includes program code to individually process a sequence of video frames received as an input of a feature map network to generate a plurality of feature maps. The non-transitory computer-readable medium also includes program code to bind the plurality of feature maps to a fixed set of slot variables using an attention model according to a motion segmentation signal. The non-transitory computer-readable medium further includes program code to combine slot states corresponding to the fixed set of slot variables into a combined feature map. The non-transitory computer-readable medium also includes program code to decode the combined feature map to form a reconstructed sequence of video frames, in which objects discovered in the reconstructed sequence of video frames are identified.

A system of compositional feature representation learning for video understanding is described. The system includes an individual feature map generation module to individually process a sequence of video frames received as an input of a feature map network to generate a plurality of feature maps. The system also includes an attention model to bind the plurality of feature maps to a fixed set of slot variables using the attention model according to a motion segmentation signal. The system further includes a combined feature map generation module to combine slot states corresponding to the fixed set of slot variables into a combined feature map. The system also includes an object discovery module to decode the combined feature map to form a reconstructed sequence of video frames, in which objects discovered in the reconstructed sequence of video frames are identified.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 8 is a flowchart illustrating a method of compositional feature representation learning for video understanding, according to aspects of the present disclosure.

DETAILED DESCRIPTION

Figure 1:
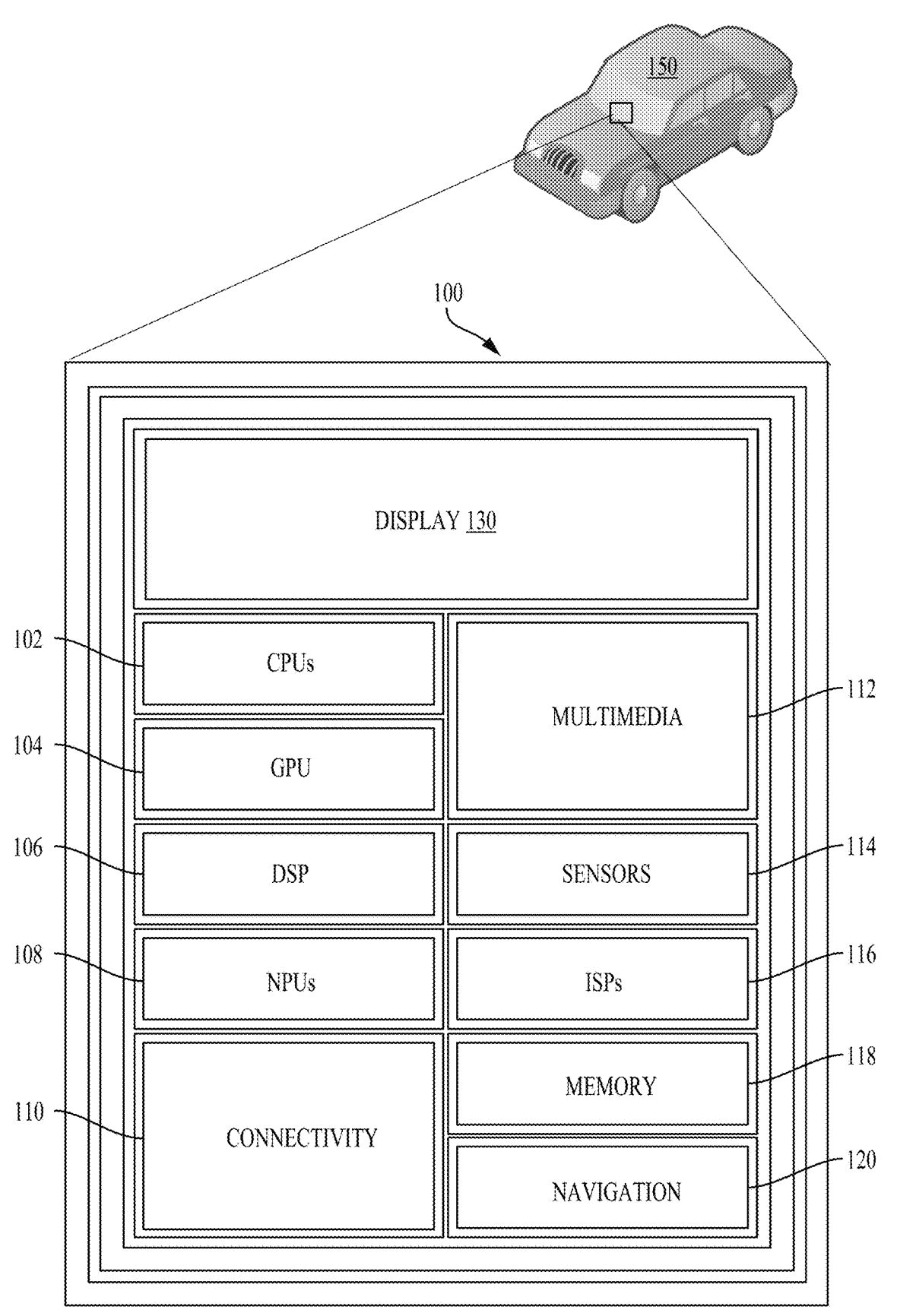
FIG. 1 illustrates an example implementation of designing a system using a system-on-a-chip (SOC) for representation learning for object discovery from unlabeled video frame sequences, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The world is not understood in terms of pixels, surfaces, or entire scenes, but rather in terms of individual objects and their combinations, because objects are the key building blocks of perception. In particular, object-centric representation enables tractable higher-level cognitive abilities such as casual reasoning, planning, etc., which are important for generalization and adaptation. In computer vision, conventional object recognition has progressed, but this approach relies on large amounts of expensive manual labels, and is limited to a fixed vocabulary of object categories.

Autonomous agents rely on computer vision using a trained convolutional neural network (CNN) to identify objects within areas of interest in an image of a surrounding scene of the autonomous agent. For example, a CNN may be trained to identify and track objects captured by sensors in communication with an autonomous vehicle for collecting unlabeled 3D data from which to perform object detection. Although unlabeled 3D data is easy to collect, state-of-the-art computer vision machine learning techniques for 3D object detection still rely on difficult-to-obtain manual annotations. Consequently, discovering objects and their extent in data in a manner that generalizes across domains remains an open problem.

The problem of object discovery involves separating objects from the background without manual labels. Existing approaches rely on appearance cues, such as color, texture, and location to group pixels into object-like regions. Unfortunately, by relying on appearance alone, these methods fail to reliably separate objects from the background in cluttered scenes. This is a fundamental limitation, because the definition of an object is inherently ambiguous and context-dependent. To resolve this ambiguity, some aspects of the present disclosure focus on dynamic objects. As described, the term "dynamic objects" refers to entities that are capable of moving independently in the world.

Some aspects of the present disclosure are directed to a scaled, auto-encoder framework for unsupervised object discovery from real world scenes using a model trained with a weak learning signal from a motion segmentation process. Despite capturing a small subset of the objects, a weak learning signal is sufficient to bias the model. In these aspects of the present disclosure, the model learns to segment both moving and static instances of dynamic objects. Advantageously, this model scales to newly collected, photo-realistic synthetic dataset with street driving scenarios. Additionally, ground truth segmentation and flow annotations may be leveraged in this dataset for thorough ablation and evaluation.

FIG. 1 illustrates an example implementation of the aforementioned system and method of representation learning for object discovery from unlabeled video frame sequences using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic key-points of objects in an area of interest, according to the display 130 illustrating a view of a vehicle. In some aspects, the NPU 108 may be implemented in the CPU 102, DSP 106, and/or GPU 104. The SOC 100 may further include sensors 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100.

In this aspect of the present disclosure, instructions loaded into a processor (e.g., CPU 102) or the NPU 108 of the ego vehicle 150 may include code to perform representation learning for object discovery from unlabeled video frame sequences captured by the sensors 114 (e.g., a LIDAR sensor/camera). The instructions loaded into the NPU 108 may also include code to individually process a sequence of video frames received as an input of a feature map network to generate a plurality of feature maps. The instructions loaded into the NPU 108 may also include code to bind the plurality of feature maps to a fixed set of slot variables using an attention model, according to a motion segmentation signal. The instructions loaded into the NPU 108 may also include code to combine slot states corresponding to the fixed set of slot variables into a combined feature map. The instructions loaded into the NPU 108 may further include code to decode the combined feature map to form a reconstructed sequence of video frames, in which objects discovered in the reconstructed sequence of video frames are identified.

Figure 2:
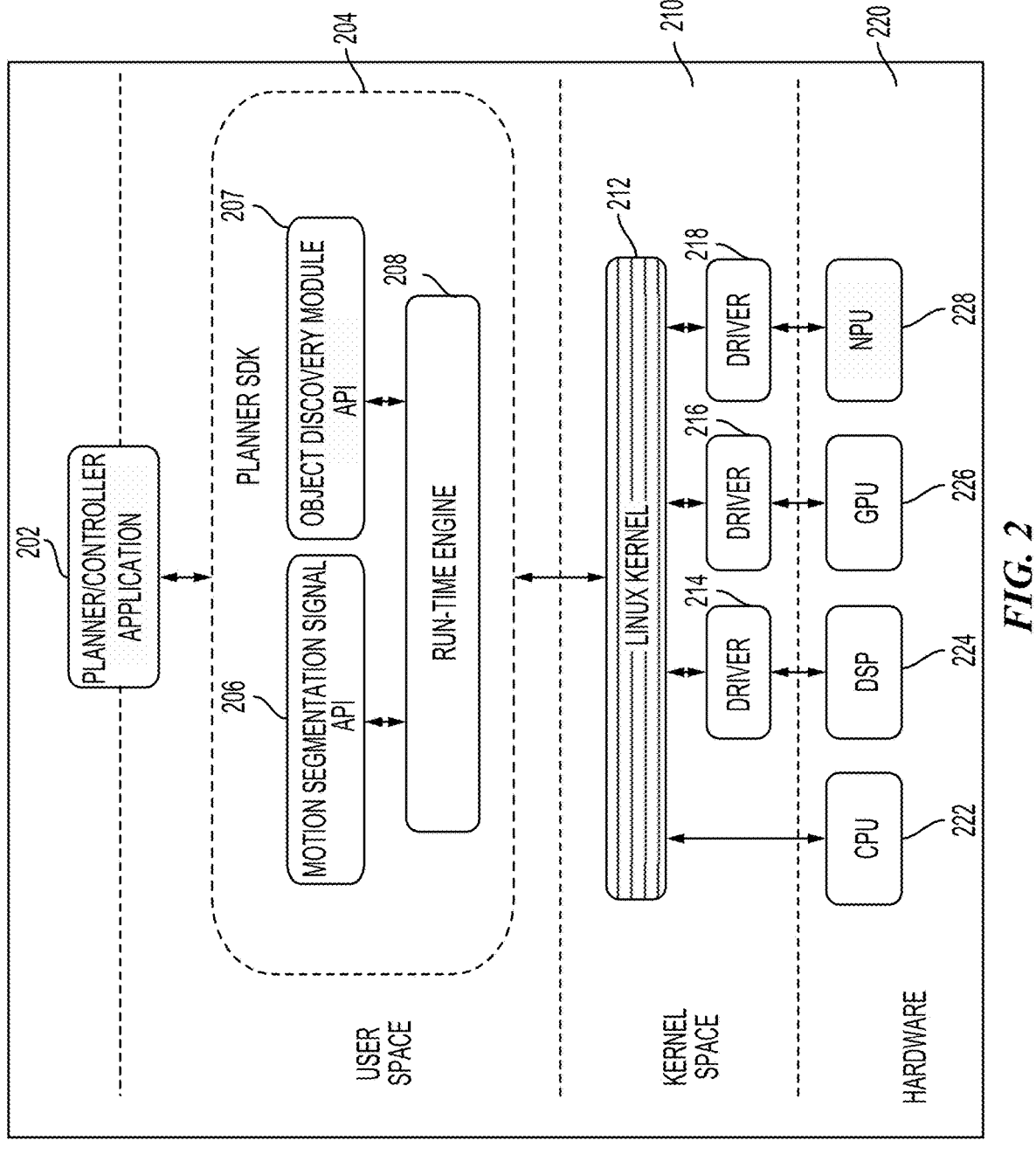
FIG. 2 is a block diagram illustrating a software architecture that may modularize functions for representation learning for object discovery in unlabeled video frame sequences, according to aspects of the present disclosure.

FIG. 2 is a block diagram illustrating a software architecture 200 that may modularize functions for representation learning for object discovery in unlabeled video frame sequences, according to aspects of the present disclosure. Using the architecture, a planner/controller application 202 is designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for representation learning and object discovery from unlabeled video frame sequences captured by a camera of an ego vehicle. The planner/controller application 202 may make a request to compile program code associated with a library defined in a motion segmentation signal application programming interface (API) 206 for binding a plurality of feature maps to a fixed set of slot variables using an attention model according to a motion segmentation signal. In addition, the attention model combines slot states corresponding to the fixed set of slot variables into a combined feature map. The planner/controller application 202 may make a request to compile program code associated with a library defined in an object discovery module API 207 for decoding the combined feature map to form a reconstructed sequence of video frames, in which objects discovered in the reconstructed sequence of video frames are identified. The planner/controller application 202 may configure a vehicle control action by planning a trajectory of the ego vehicle, according to the discovered objects within a scene surrounding the ego vehicle detected from the reconstructed video frame sequences.

A run-time engine 208, which may be compiled code of a runtime framework, may be further accessible to the planner/controller application 202. The planner/controller application 202 may cause the run-time engine 208, for example, to perform tracking of moving objects in subsequent point cloud sequences of a LIDAR camera stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
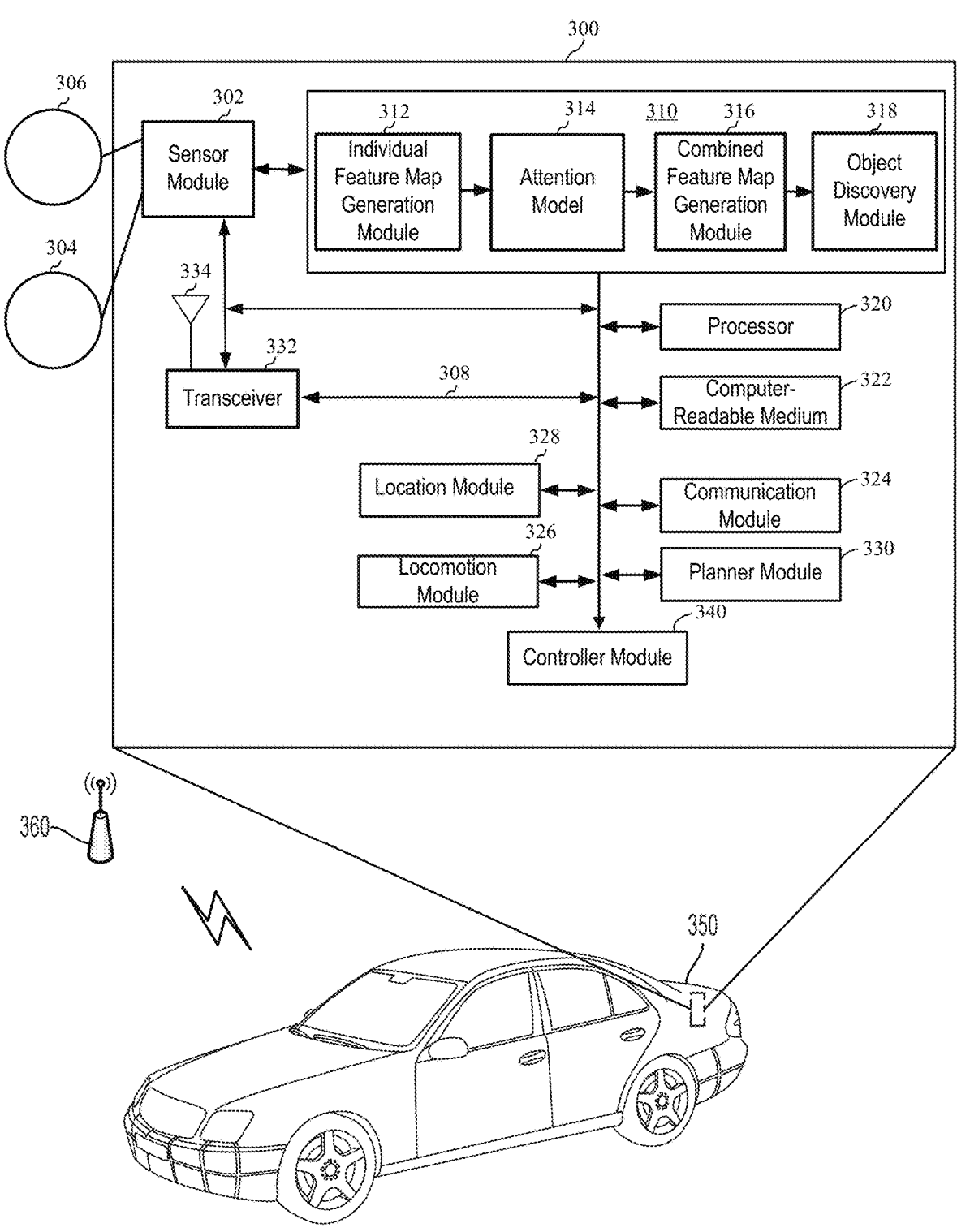
FIG. 3 is a diagram illustrating an example of a hardware implementation for a representation learning and object discovery system from unlabeled video frame sequences, according to aspects of the present disclosure.

FIG. 3 is a diagram illustrating an example of a hardware implementation for a representation learning and object discovery system 300 from unlabeled video frame sequences, according to aspects of the present disclosure. The representation learning and object discovery system 300 may be configured for planning and control of an ego vehicle in response to discovered objects in video frame sequences captured by a camera during operation of a car 350. The representation learning and object discovery system 300 may be a component of a vehicle, a robotic device, or other device. For example, as shown in FIG. 3, the representation learning and object discovery system 300 is a component of the car 350. Aspects of the present disclosure are not limited to the representation learning and object discovery system 300 being a component of the car 350, as other devices, such as a bus, motorcycle, or other like vehicle, are also contemplated for using the representation learning and object discovery system 300. The car 350 may be autonomous or semi-autonomous.

The representation learning and object discovery system 300 may be implemented with an interconnected architecture, represented generally by an interconnect 308. The interconnect 308 may include any number of point-to-point interconnects, buses, and/or bridges depending on the specific application of the representation learning and object discovery system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The representation learning and object discovery system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit the pseudo-labeled point cloud sequences and/or planned actions from the ego perception module 310 to a server (not shown).

The representation learning and object discovery system 300 includes the processor 320 coupled to the computer-readable medium 322. The processor 320 performs processing, including the execution of software stored on the computer-readable medium 322 to provide representation learning and object discovery functionality based on unlabeled video frame sequences, according to aspects of the present disclosure. The software, when executed by the processor 320, causes the representation learning and object discovery system 300 to perform the various functions described for ego vehicle perception based on object discovery from unlabeled video frame sequences captured by a camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module

328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the representation learning and object discovery system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X), LTE-driver-to-driver (D2D), Voice over LTE (VoLTE), or any other mobile data network or combination of mobile data networks. Further, the network access point 360 may include one or more IEEE 802.11 wireless networks.

The representation learning and object discovery system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Autonomous agents, such as the car 350, rely on computer vision using a trained convolutional neural network (CNN) to identify objects within areas of interest in an image of a surrounding scene of the autonomous agent. For example, a CNN may be trained to identify and track objects captured by sensors in communication with the car 350 for collecting unlabeled 3D data from which to perform object discovery. Although unlabeled 3D data is easy to collect, state-of-the-art computer vision machine learning techniques for object discovery rely on difficult-to-obtain manual annotations. In spite of progress using conventional object recognition, these approaches rely on large amounts of expensive manual labels, and are limited to a fixed vocabulary of object categories. Consequently, discovering objects and their extent in data using a manner that generalizes across domains remains an open problem.

The problem of object discovery involves separating objects from the background without manual labels. Existing approaches rely on appearance cues, such as color, texture, and location to group pixels into object-like regions. Unfortunately, by relying on appearance alone, these methods fail to reliably separate objects from the background in cluttered scenes. This is a fundamental limitation, because the definition of an object is inherently ambiguous and context-dependent. To resolve this ambiguity, some aspects of the present disclosure focus on dynamic objects. As described, the term "dynamic objects" refers to entities that are capable of moving independently in the world.

Some aspects of the present disclosure are directed to a scaled, auto-encoder framework for unsupervised object discovery from real world scenes using a model trained with a motion segmentation signal from a part of a motion supervision process. Despite capturing a small subset of the objects, a weak learning signal is sufficient to bias the model. In these aspects of the present disclosure, the model learns to segment both moving and static instances of dynamic objects. Advantageously, this model scales to newly collected, photo-realistic synthetic dataset with street driving scenarios. Additionally, ground truth segmentation and flow annotations may be leveraged in this dataset for thorough ablation and evaluation.

As shown in FIG. 3, the ego perception module 310 includes an individual feature map generation module 312, an attention model 314, a combined feature map generation module 316, and an object discovery module 318. The individual feature map generation module 312, the attention model 314, the combined feature map generation module 316, and the object discovery module 318 may be components of a same or different artificial neural network. For example, the artificial neural network is a convolutional neural network (CNN) communicably coupled to a camera of the car 350. The ego perception module 310 receives unlabeled video frame sequences from the first sensor 304 and/or the second sensor 306. In one configuration, the first sensor 304 and the second sensor 306 are configured as an RGB camera sensor.

The ego perception module 310 is configured to perform object discovery from unlabeled video frame sequences, according to aspects of the present disclosure. In this aspect of the present disclosure, the individual feature map generation module 312 is configured to individually process a sequence of video frames captured by the first sensor 304 and/or the second sensor 306 and provided as input to a feature map network to generate a plurality of feature maps. In some aspects of the present disclosure, the feature map network is composed of a CNN backbone followed by a convolutional gated recurrent unit (ConvGRU). In response, the attention model 314 is configured to bind the plurality of feature maps to a fixed set of slot variables using an attention model, according to a motion segmentation signal. The motion segmentation signal may provide a motion-based learning signal to separate moving objects from static objects. For example, the motion segmentation signal is used to guide the masks generated by the attention model 314 to focus on the dynamic objects. That is, the motion segmentation signal is a guiding signal to the attention model 314. Next, the combined feature map generation module 316 is configured to combine slot states corresponding to the fixed set of slot variables into a combined feature map.

In some aspects of the present disclosure, the combined feature map generation module 316 is configured to perform feature embedding within the combined feature map. Based on the feature embedding, the object discovery module 318 is configured to decode the combined feature map to form a reconstructed sequence of video frames, in which objects discovered in the reconstructed sequence of video frames are identified. The representation learning and object discovery system 300 may be configured for planning and control of an ego vehicle based on detected objects according to discovered objects from feature embedding of video frame sequences from an RGB camera sensor during operation of an ego vehicle, for example, as shown in FIG. 4.

Figure 4:
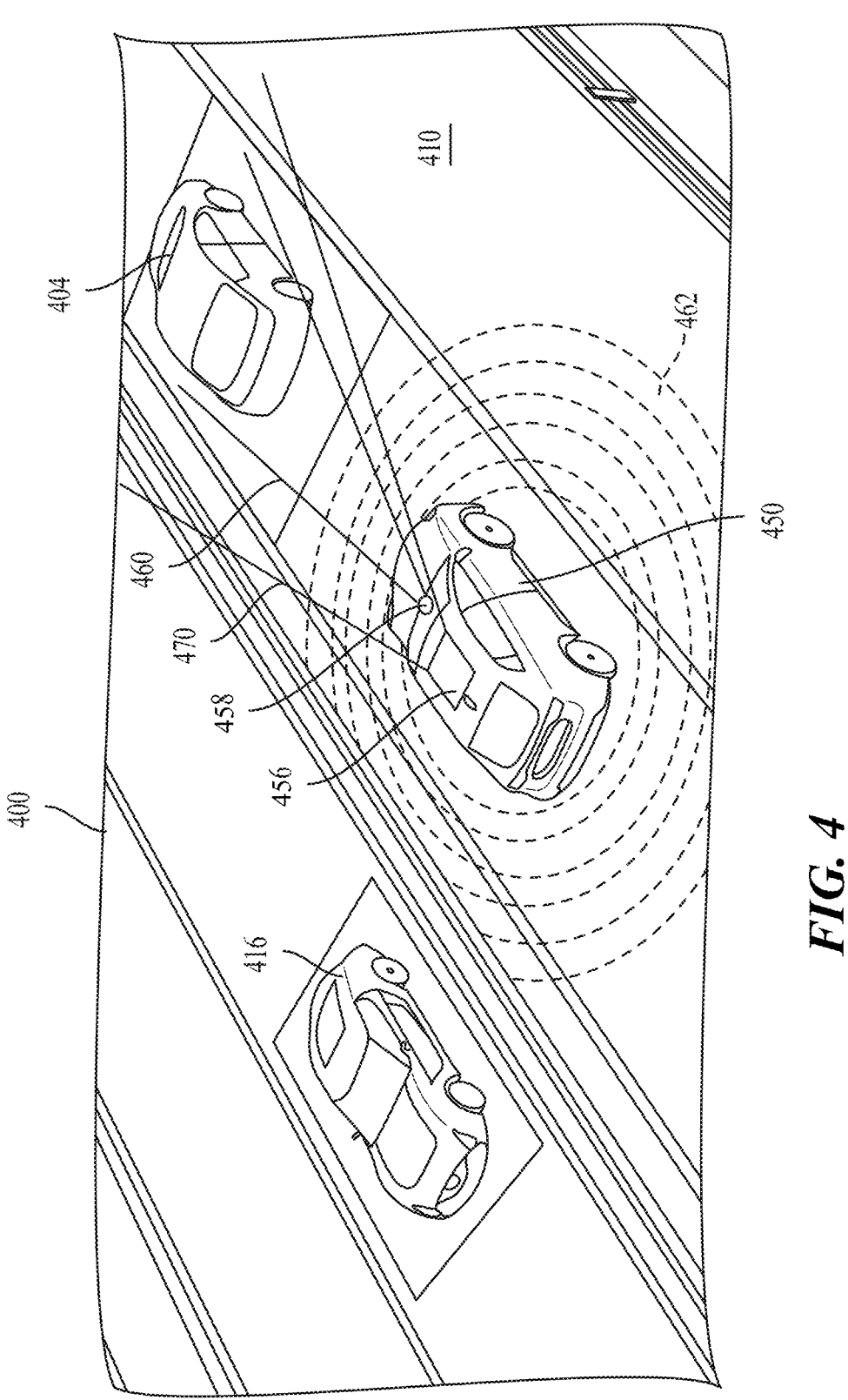
FIG. 4 is a drawing illustrating an example of an ego vehicle in an environment, according to aspects of the present disclosure.

FIG. 4 illustrates an example of an ego vehicle 450 (e.g., the car 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 456, such as a 2D red-green-blue (RGB) camera, and a light detection and ranging (LIDAR) camera 458. Alternatively, the LIDAR camera 458 may be another RGB camera or another type of sensor, such as ultrasound, and/or a radio detection and ranging (RADAR) sensor, as shown by reference number 462. Additionally, or alternatively, the ego vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The 2D camera 456 may generate unlabeled video frame sequences. The unlabeled video frame sequences captured by the 2D camera 456 may include a 2D RGB video frame of the first vehicle 404, as the first vehicle 404 is in the field of view 460 of the 2D camera 456. A field of view 470 of the LIDAR camera 458 is also shown.

The information obtained from the 2D camera 456 and the LIDAR camera 458 may be used to navigate the ego vehicle 450 along a route when the ego vehicle 450 is in an autonomous mode. The 2D camera 456 and the LIDAR camera 458 may be powered from electricity provided from the battery (not shown) of the ego vehicle 450. The battery may also power the motor of the ego vehicle 450. The information obtained from the 2D camera 456 may be used to discover an object using self-supervised motion-based learning to separate moving objects from static objects in the captured video frame sequences.

As opposed to highly expensive human-annotated labels, the ego vehicle 450, using the 2D camera 456, can readily collect unlabeled video frame sequences while traveling on the road 410. Some aspects of the present disclosure are directed to representation learning from unlabeled video frame sequences captured by the 2D camera 456 of the ego vehicle 450. These aspects of the present disclosure recognize that motion-based learning for separating moving objects from static objects enables reliable object discovery from video frame sequences without relying on human-labeled 3D bounding boxes. For example, moving objects separated from static objects in input video frame sequences provide sufficient supervision for object discovery. These aspects of the present disclosure learn video features that generalize to both moving and static objects using supervision based on motion-based learning from video frames, for example, as shown in FIG. 5.

Figure 5:
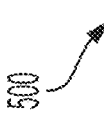
FIG. 5 is a diagram illustrating video understanding to perform feature embedding to enable object detection, segmentation, and tracking, according to aspects of the present disclosure.

FIG. 5 is a diagram illustrating video understanding 500 to perform feature embedding to enable object detection, segmentation, and tracking, according to aspects of the present disclosure. As previously noted, the world is not understood in terms of pixels, surfaces, or entire scenes, but rather in terms of individual objects and their combinations because objects are the key building blocks of perception. In particular, object-centric representation enables tractable higher-level cognitive abilities such as casual reasoning, planning, etc., which are important for generalization and adaptation. In computer vision, conventional object recognition has progressed, but these approaches rely on large amounts of expensive manual labels, and are limited to a fixed vocabulary of object categories. Consequently, discovering objects and their extent in data in a manner that generalizes across domains remains an open problem.

The task of discovering objects is especially challenging due to the notion that objects are inherently ambiguous and context-dependent. Consider a car 510 captured in unlabeled video frame sequences 502 shown in FIG. 5. A left door and a handle on the door of the car 510 may be treated as individual objects, or parts of the whole. It is thus not surprising that existing approaches that attempt to automatically separate objects from the background based on appearance struggle beyond controlled scenarios. In particular, classical methods that use graph-based inference tend to over-segment or under-segment the objects. More recent learning-based methods model object discovery with structured generative networks and may leverage iterative inference in the bottleneck of an auto-encoder. While promising results have been demonstrated, these approaches are typically restricted to toy images with colored geometric shapes on a plain background, and completely fail on realistic scenes, such as shown in FIG. 5.

Some aspects of the present disclosure posit that while the ambiguity of object definition is not resolvable in the static image world without direct supervision, object definition has a natural resolution in the dynamic world of videos. Concretely, these aspects of the present disclosure focus on dynamic objects, which are defined as entities that are capable of moving independently in the world. These aspects of the present disclosure rely on independent object motion as a strong grouping cue. Aspects of the present disclosure utilize motion segmentation to automatically separate moving objects from the background based on optical flow to provide feature embedding 520. This feature embedding 520 may use motion segmentation to automatically separate moving objects from the background based on optical flow to enable object detection 530, segmentation 540, and object tracking 550, according to aspects of the present disclosure.

Figure 6:
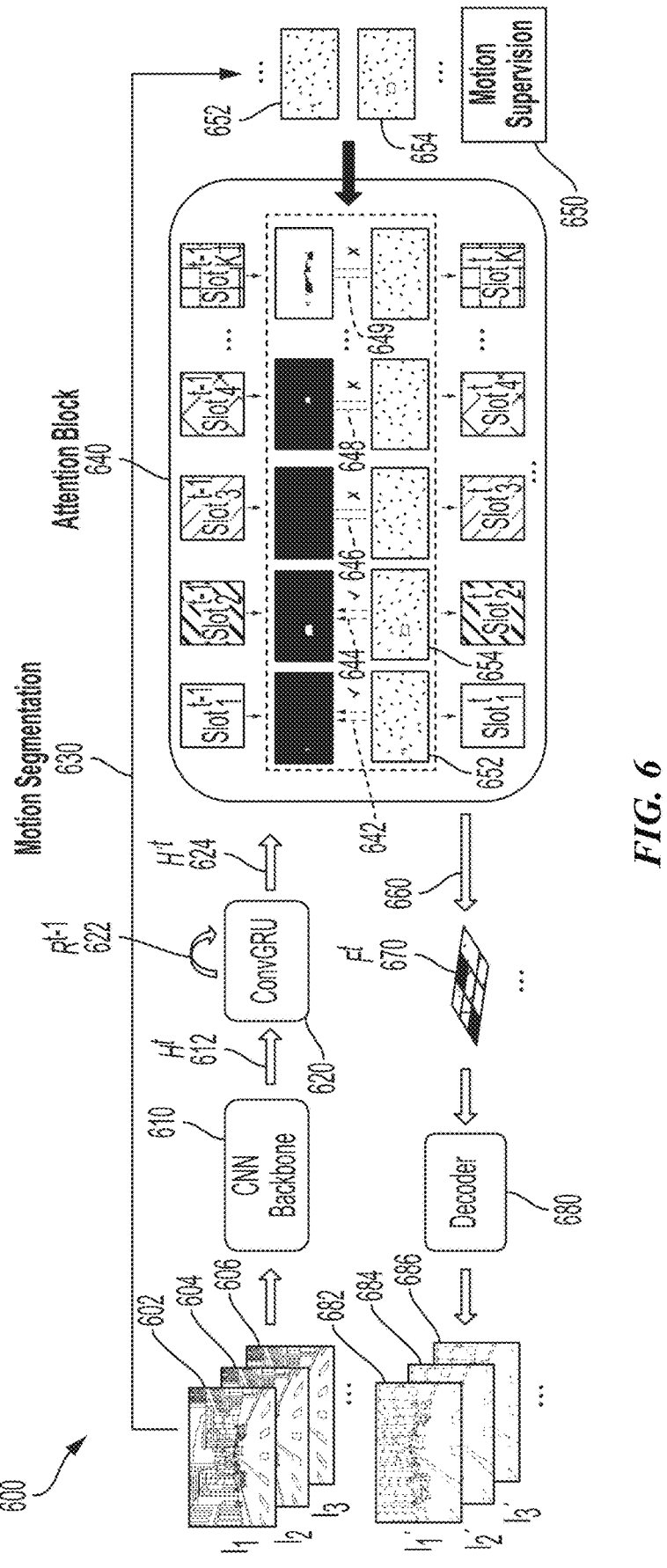
FIG. 6 is a diagram illustrating an overview of a representation learning and object discovery framework, in which objects are discovered from input video frame sequences, according to aspects of the present disclosure.

FIG. 6 is a diagram illustrating an overview of a representation learning and object discovery framework 600, in which objects are discovered from input video frame sequences, according to aspects of the present disclosure. FIG. 6 illustrates video frame sequences 602 ($I_1$), 604 ($I_2$), and 606 ($I_3$), which may be captured using the 2D camera 456 of the ego vehicle 450, as shown in FIG. 4. FIG. 6 illustrates a process for representation learning for object discovery from unlabeled video sequences performed by the representation learning and object discovery framework 600, according to aspects of the present disclosure.

In some aspects of the present disclosure, the representation learning and object discovery framework 600 operates by taking the video frame sequences 602 ($I_1$), 604 ($I_2$), and 606 ($I_3$) as input, and individually processing the video frame sequences 602 ($I_1$), 604 ($I_2$), and 606 ($I_3$) using a backbone network 610 (e.g., a CNN backbone) and a recurrent memory module 620 (e.g., a ConvGRU). The resulting feature maps H't 624 are passed to an attention model 640 that binds the feature maps H't 624 to a fixed set of slot variables using an attention operation. Some aspects of the present disclosure utilize a motion supervision block 650 and an automatically estimated motion segmentation signal 630 to guide the attention operation for a subset of the slots (e.g., 642, 644, 646, 648, and 649). In this example, the slot states 660 are combined in a single output feature map $F^t$ 670 that is decoded by a decoder CNN 680 to form reconstructed video frames 682 ($I_1$'), 684 ($I_2$'), and 686 ($I_3$'). In these aspects of the present disclosure, a reconstruction objective enforces generalization from moving to static instances of objects.

In this aspect of the present disclosure, the representation learning and object discovery framework 600 bootstraps the estimated motion segmentation signal 630 and the motion supervision block 650 to group instances even when they are static. In this example, the representation learning and object discovery framework 600 is configured for unsupervised object discovery in the video frame sequences 602 ($I_1$), 604 ($I_2$), and 606 ($I_3$) by leveraging independent object motion using the motion supervision block 650. In these aspects of the present disclosure, the recurrent memory module 620 enables the representation learning and object discovery framework 600 to support object discovery in videos of arbitrary length by simplifying the grouping mechanism to scale the model to realistic scenes with large resolution and dozens of objects. These aspects of the present disclosure rely on inductive biases based on independent object motion on an emergent representation and the extent for capturing objects. In particular, the estimated motion segmentation signal 630 is used by the motion supervision block 650 to guide operation of the attention model 640 in the discovery of static objects. In this example, the estimated motion segmentation signal 630 of varying quality—even when sparse and noisy—is sufficient to bias the attention model 640 towards segmenting both moving and static instances. This approach involves videos for training, and can segment objects in static images at inference time.

In some aspects of the present disclosure, operation of the representation learning and object discovery framework 600 involves solving the problem of object discovery in realistic videos by capitalizing on motion segmentation as a learning signal for bottom-up grouping. As described, object discovery refers to the problem of separating objects from the background without manual labels, which is traditionally solved by appearance-based methods, which are not well equipped to resolve the inherent ambiguity of the object definition. Some aspects of the present disclosure extend slot attention to realistic videos by modifying an architecture of a slot attention model for scaling to large scenes with dozens of objects.

In this aspect of the present disclosure, the attention model 640 binds a set of variables, called slots, to image locations. The slots are then decoded individually and combined to reconstruct the image. As shown in FIG. 6, the attention model 640 incorporates inductive biases in the form of the estimated motion segmentation signal 630, which naturally resolves the object/background ambiguity. In these aspects of the present disclosure, the attention model 640 uses the estimated motion segmentation signal 630 as a sparse learning signal, and the attention model 640 does not rely on the motion information being able to segment both moving and static instances. For example, the attention model 640 uses independent object motion as a learning signal, allowing the attention model 640 (once trained) to generalize to real-world scenes.

As further described, motion segmentation is concerned with separating objects from the background using an optical flow. Conventional approaches track individual pixels with flow and then cluster the resulting trajectories. Unfortunately, these conventional approaches do not generalize well in the wild due to their heuristic-based nature. As also described, learning from motion relies on independent object motion as a cue for the discovery objects, as performed by the human visual system. The solution to the problem of object discovery from unlabeled videos remains an open question.

In some aspects of the present disclosure, the attention model 640 is configured according to a slot attention mechanism that models object discovery as inference in an auto-encoder framework. In operation, the representation learning and object discovery framework 600 receives the video frame sequences 602, 604, and 606 (e.g., $\{I^1, I^2, \ldots, I^T\}$) as input. Each of the sequence of video frames is then processed by the backbone network 610 (e.g., a CNN backbone), to obtain individual frame representations 612 (e.g., $H_t=f_{enc}(I^t) \in \mathbb{R}^{H' \times w' \times D_{inp}}$) These individual frame representations 612 are aggregated by a recurrent memory module 620 (e.g., a ConvGRU) to obtain feature maps 624 (e.g., video encoding) via $H'^t=\text{ConvGRU}(R^{t-1}, H^t)$, where $R^{t-1} \in \mathbb{R}^{H' \times w' \times D_{inp}}$ is the recurrent memory state 622.

Operation of the representation learning and object discovery framework 600 proceeds by mapping the video representation H't (e.g., feature maps 624) to a set of slots $S^t$ (e.g., 642, 644, 646, 648, 649). Some aspects of the present disclosure avoid a nested recurrence during mapping of the video representation H't 624 to a set of slots $S^t$ (e.g., 642, 644, 646, 648, 649). To address this issue, these aspects of the present disclosure perform a single attention operation to directly compute the slot state $S^t=W^t v(H'^t) \in \mathbb{R}^{K \times D}$ where an attention matrix $W^t$ is computed using the slot state in the previous frame $S^{t-1}$. For the first frame, aspects of the present disclosure use a learnable initial state $S^0$. These aspects of the present disclosure increase the number of slots to a maximum expected number of objects for generalizing to scenes of varying complexity.

Operation of the representation learning and object discovery framework 600 continues by processing the resulting slot states $S^t$ using the decoder CNN 680 to obtain the video frame reconstruction (e.g., 682, 684, and 686). Prior to processing the resulting slot states $S^t$ using the decoder CNN 680, aspects of the present disclosure invert the order of slot decoding and slot recombination steps. In particular, each individual slot feature $$S_i^t \in \mathbb{R}_{slot}^D,$$

is first broadcast to a feature map $$F_i^t \in \mathbb{R}^{H' \times W' \times D_{slot}}$$

and the attention mask $$W_{:,i}^t$$

of the slot is used as an alpha mask $$A_i^t.$$

A single output feature map 670

$$\left( e.g., F^t = \sum_i A_i^t * F_i^t \right)$$

is then constructed. In this example, the single output feature map 670 is shown with a checkerboard pattern, and is decoded via $I'^t = f_{dec}(F_t) \in \mathbb{R}^{H \times w \times 3}$ using the decoder CNN 680. As described, slots may refer to a set of feature vectors having a fixed length.

As shown in FIG. 6, the estimated motion segmentation signal 630 provides a set of sparse, instance-level motion segmentation masks $\mathcal{M} = \{M^1, M^2, \ldots, M^T\}$ with each sequence of video frames, with $M^t = \{m_1, m_2, \ldots, m_{C^t}\}$, where Ct is the number of moving objects that were successfully segmented in frame t, and $m_j \in \{0,1\}^{H \times W}$ is a binary segmentation mask. It is noted that for each video frame it is possible that $M_t = \emptyset$. This reflects the realistic assumption that a variable number of objects can be moving in any given frame and that in some video frames all the objects can be static.

In some aspects of the present disclosure, the motion supervision block 650 utilizes the motion segmentation masks 652, 654 to directly supervise the slot attention maps $W^t \in \mathbb{R}^{N \times K}$, where $N = H' \times W'$. These aspects of the present disclosure map a variable number of motion segmentations Ct to a fixed number of slots K in each of the video frames. For example, an optimal bipartite matching between the predicted slots and the motion segmentation masks 652, 654 is first identified, and then an object-specific segmentation loss is optimized. Specifically, these aspects of the present disclosure consider the motion segmentation mask $M^t$ as a set of length K padded with $\emptyset$ (no object). To find a bipartite matching between these two sets, these aspects of the present disclosure search for a permutation of K elements with the lowest cost according to Equation (1):

$$\hat{\sigma} = \arg \min_{\sigma} \sum_{i=1}^{K} \mathcal{L}_{seg}(m_i^t, W_{:,\sigma(i)}^t), \tag{1}$$

where $$\mathcal{L}_{seg}(m_i^t, W_{:,\sigma(i)}^t)$$

is the segmentation loss between the motion mask $$m_i^t$$

and the attention map of the slot with index $\sigma(i)$. In practice, these aspects of the present disclosure efficiently approximate the optimal assignment with a greedy matching algorithm.

Once the assignment $\hat{\sigma}$ has been computed, the final motion supervision objective is defined as follows:

$$\mathcal{L}_{rmotion} = \sum_{i=1}^{K} \mathbb{1}_{\{m_i^t \neq \emptyset\}} \mathcal{L}_{rseg}(m_i^t, W_{:,\sigma(i)}^t). \tag{2}$$

In these aspects of the present disclosure, the loss is computed for the slots for which a motion mask has been assigned, and the remaining slots are not constrained and can bind to any regions in the image. For example, as shown in FIG. 6, motion segmentation masks 652 and 654 are available for only two objects in a crowded outdoor scene, and they get matched to the slots 642 and 644, whose attention maps are most similar to the masks. Remaining slots (e.g., 646, 648, and 649) are unconstrained, but still manage to capture both moving and static objects, as well as the background, driven by the image reconstruction objective. The actual segmentation loss $\mathcal{L}_{seg}$ in Equation (2) is a binary cross entropy, for example, as shown in Equation (3):

$$\mathcal{L}_{seg}(m, W) = \sum_{j=1}^{N} -m_j \log(W_j) - (1 - m_j) \log(1 - W_j), \tag{3}$$

where N is the spatial dimension of the attention map W.

A final loss function and optimization objective is defined as follows:

$$\mathcal{L} = \mathcal{L}_{recon} + \lambda_M \mathcal{L}_{motion} + \gamma_T \mathcal{L}_{temp}, \tag{4}$$

where $\mathcal{L}$ recon is the MSE loss for the image reconstruction, $\mathcal{L}_{temp}$ is a temporal consistency regularization term, and $\lambda_M$ and $\lambda_T$ are the weights for the motion supervision and temporal consistency terms. The latter is defined as:

$$\mathcal{L}_{temp}(S) = \sum_{t=1}^{T-1} \left\| \mathbb{I} - \text{softmax}\left(S^t \cdot \left(S^{t+1}\right)^T\right)\right\|, \qquad (5)$$

where $\mathbb{I} \in \mathbb{R}^{K \times K}$ is the identity matrix. It is noted that this term is a form of a temporal contrastive loss encouraging similarity between feature representations of the slots in consecutive frames and thus improving the temporal consistency of the slot buildings. The model is trained on video clips of length T and ensure that at least half of the clips in a batch have a non-empty set of motion segmentations $\mathcal{M}$.

Figure 7A:
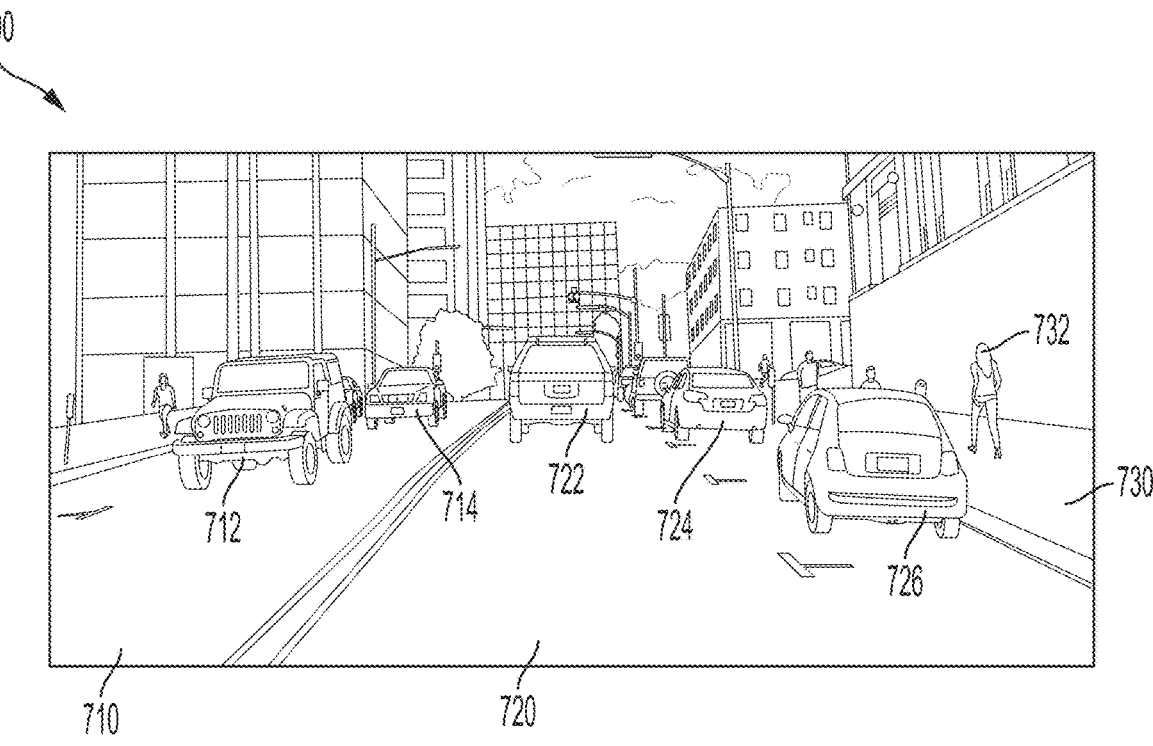
FIGS. 7A and 7B are video frames of a roadway illustrating objects before an object discovery process and after the object discovery process, according to aspects of the present disclosure.
Figure 7B:
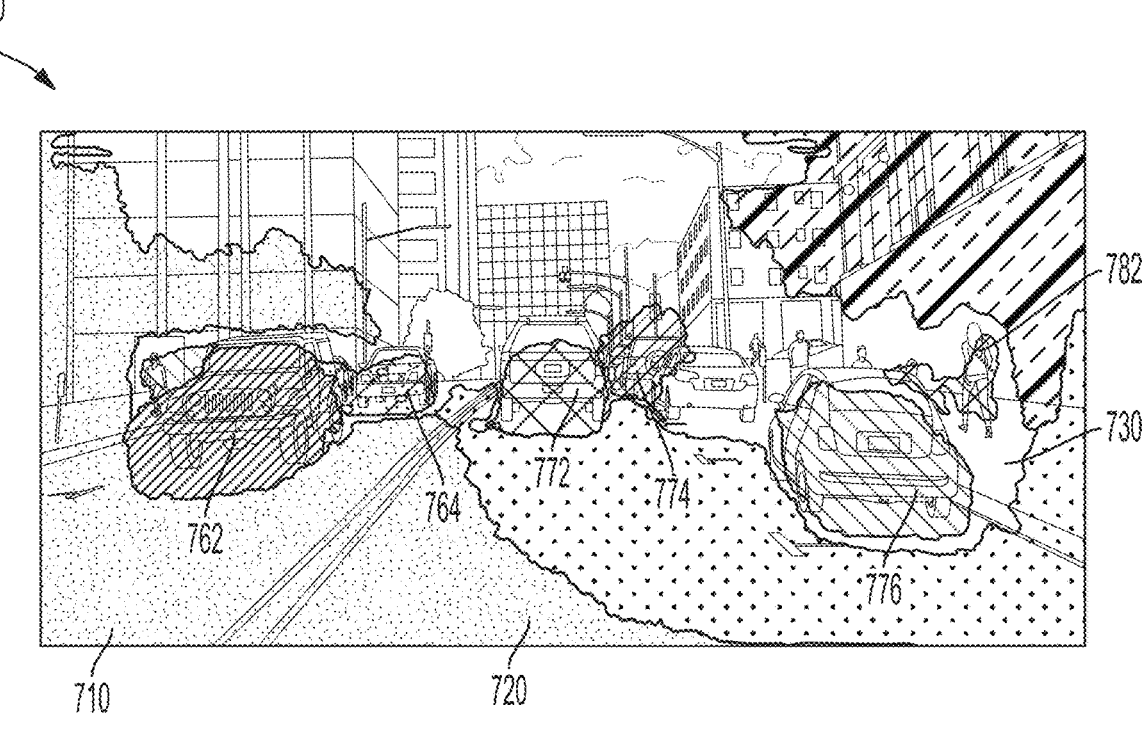

FIGS. 7A and 7B are video frames of a roadway, illustrating objects before an object discovery process and after the object discovery process, according to aspects of the present disclosure. FIG. 7A illustrates a roadway 700 including an oncoming traffic lane 710 and an outgoing traffic lane 720. In this example, the oncoming traffic lane 710 includes a first oncoming vehicle 712 and a second oncoming vehicle 714. In addition, the outgoing traffic lane 720 includes a first outgoing vehicle 722, a first parked vehicle 724, and a second parked vehicle 726. A sidewalk 730 is also shown, including an outgoing pedestrian 732.

FIG. 7B illustrates the roadway 700 of FIG. 7A after application of an object discovery process 750, according to aspects of the present disclosure. As shown in FIG. 7B, the oncoming traffic lane 710 is analyzed to provide a feature embedding, including a first oncoming vehicle segmentation 762 and a second oncoming vehicle segmentation 764. In addition, the outgoing traffic lane 720 is analyzed to provide a feature embedding, including a first outgoing vehicle segmentation 772, a first parked vehicle segmentation 774, and a second parked vehicle segmentation 776. A sidewalk 730 is also analyzed to provide a feature embedding, including an outgoing pedestrian segmentation 782, using, for example, 2D bounding boxes estimated from 2D instance masks for the objects discovered in the sequence of video frames. A process of representation learning for object detection from unlabeled video frame sequences is further described in FIG. 8.

FIG. 8 is a flowchart illustrating a method of compositional feature representation learning for video understanding, according to aspects of the present disclosure. The method 800 begins at block 802, in which a sequence of video frames received as an input of a feature map network are individually processed to generate a plurality of feature maps. For example, FIG. 6 illustrates the video frame sequences 602 ($I_1$), 604 ($I_2$), and 606 ($I_3$), which may be captured using the 2D camera 456 of the ego vehicle 450, as shown in FIG. 4. In this example, the representation learning and object discovery framework 600 operates by taking the video frame sequences 602 ($I_1$), 604 ($I_2$), and 606 ($I_3$) as input and individually processing the video frame sequences 602 ($I_1$), 604 ($I_2$), and 606 ($I_3$) using a backbone network 610 (e.g., a CNN backbone), and a recurrent memory module 620 (e.g., a ConvGRU) to form the feature maps $H'^t$ 624.

At block 804, the plurality of feature maps are bound to a fixed set of slot variables using an attention model according to a motion segmentation signal. For example, as shown in FIG. 6, The resulting feature maps H't 624 are passed to an attention model 640 that binds the feature maps H't 624 to a fixed set of slot variables using an attention operation. Some aspects of the present disclosure utilize a motion supervision block 650 and an automatically estimated motion segmentation signal 630 to guide the attention operation for a subset of the slots (e.g., 642, 644, 646, 648, and 649). For example, as shown in FIG. 6, motion segmentation masks 652 and 654 are available for two of the objects in the crowded outdoor scene, and motion segmentation masks 652 and 654 are matched to the slots 642 and 644, whose attention maps are most similar to the motion segmentation masks 652 and 654.

At block 806, the slot states corresponding to the fixed set of slot variables are combined into a combined feature map. For example, as illustrated in FIG. 6, prior to processing the resulting slot states $S^t$ using the decoder CNN 680, aspects of the present disclosure invert the order of slot decoding and slot recombination steps. In particular, each individual slot feature $$S_i^t \in \mathbb{R}_{slot}^D,$$

is first broadcast to a feature map $$F_i^t \in \mathbb{R}^{H' \times W' \times D_{slot}}$$

and the attention mask $$W_{:,i}^t$$

of the slot is used as an alpha mask $$A_i^t.$$

A single output feature map 670

$$\left(\text{e.g., } F^t = \sum_i A_i^t * F_i^t\right)$$

is then constructed. In this example, the combining of the slot states 660 into the single output feature map $F^t$ 670 is shown with a checkerboard pattern.

At block 808, the combined feature map is decoded to form a reconstructed sequence of video frames, in which objects discovered in the reconstructed sequence of video frames are identified. For example, FIG. 6 illustrates the slot states 660 combined in the single output feature map $F^t$ 670 that is decoded by a decoder CNN 680 to form reconstructed video frames $$682 \ (I_1'), 684 \ (I_2'), \text{ and } 686 \ (I_3').$$

In this example, the single output feature map 670 is decoded via $I'^t = f_{dec}(F_t) \in \mathbb{R}^{H \times W \times 3}$ using the decoder CNN 680. As described, slots may refer to a set of feature vectors having a fixed length. In these aspects of the present disclosure, a reconstruction objective enforces generalization from moving to static instances of objects.

The method 800 may also include planning a vehicle control action of an ego vehicle according to 2D bounding boxes identifying objects within a scene surrounding the ego vehicle. For example, as shown in FIG. 3, the representation learning and object discovery system 300 may be configured for planning and control of an ego vehicle using 3D bounding boxes estimated from unlabeled video frame sequences from video frames of a 2D camera during operation of the ego vehicle, for example, as shown in FIG. 4.

The method 800 further includes using motion supervision for training the attention model to assign the fixed set of slot variables distinguishing a foreground of a sequence of video frames from a background of the sequence of video frames. The method 800 also includes estimating 3D bounding boxes for the objects discovered in the sequence of video frames. The method 800 also includes segmenting the objects discovered in the sequence of video frames. The method 800 further includes tracking the objects discovered in the sequence of video frames. The method 800 also includes decoding of the combined feature map by embedding features within the reconstructed sequence of video frames.

Some aspects of the present disclosure are directed to discovering objects and their extent from raw data, which is a challenging problem due to the ambiguity of what constitutes an object. Some aspects of the present disclosure propose an object discovery process to automatically resolve this ambiguity by focusing on dynamic objects and using independent motion as an inductive bias in an object discovery framework. The object discovery process also generalizes to non-dynamic objects. While independent object motion provides a convenient signal for object discovery from data, independent object motion ignores objects that are not capable of moving by themselves, but might be important for downstream tasks. In particular, in indoor environments people interact with accessories, electronics, food, etc., and capturing these objects is important for developing a generic object discovery algorithm.

In some aspects of the present disclosure, the method 900 may be performed by the system-on-a-chip (SOC) 100 (FIG. 1) or the software architecture 200 (FIG. 2) of the ego vehicle 150 (FIG. 1). That is, each of the elements of the method 900 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of compositional feature representation learning for video understanding, comprising:

individually processing a sequence of video frames received as an input of a feature map network to generate a plurality of feature maps;

binding the plurality of feature maps to a fixed set of slot variables using an attention model according to a motion segmentation signal;

combining slot states corresponding to the fixed set of slot variables into a combined feature map;

decoding the combined feature map to form a reconstructed sequence of video frames, in which dynamic objects discovered in the reconstructed sequence of video frames are identified by 2D bounding boxes estimated from 2D instance masks estimated to focus on the dynamic objects discovered instead of non-dynamic objects in the reconstructed sequence of video frames; and controlling an ego vehicle to follow a planned trajectory adjusted for collision avoidance in response to the dynamic objects discovered in the reconstructed sequence of video frames in a scene captured by and surrounding the ego vehicle.

2. The method of claim 1, in which binding the plurality of feature maps comprises separating the moving objects from static objects in the plurality of feature maps based on the motion segmentation signal.

3. The method of claim 1, further comprising using motion supervision for training the attention model to assign the fixed set of slot variables distinguishing a foreground of a sequence of video frames from a background of the sequence of video frames.

4. The method of claim 1, further comprises segmenting the objects discovered in the sequence of video frames.

5. The method of claim 1, further comprises tracking the objects discovered in the sequence of video frames.

6. The method of claim 1, in which decoding the combined feature map comprises embedding features within the reconstructed sequence of video frames.

7. A non-transitory computer-readable medium having program code recorded thereon of compositional feature representation learning for video understanding, the program code being executed by a processor and comprising:

program code to individually process a sequence of video frames received as an input of a feature map network to generate a plurality of feature maps;

program code to bind the plurality of feature maps to a fixed set of slot variables using an attention model according to a motion segmentation signal;

program code to combine slot states corresponding to the fixed set of slot variables into a combined feature map;

program code to decode the combined feature map to form a reconstructed sequence of video frames, in which dynamic objects discovered in the reconstructed sequence of video frames are identified by 2D bounding boxes estimated from 2D instance masks estimated to focus on the dynamic objects discovered instead of non-dynamic objects in the reconstructed sequence of video frames; and program code to control an ego vehicle to follow a planned trajectory adjusted for collision avoidance in response to the dynamic objects discovered in the reconstructed sequence of video frames in a scene captured by and surrounding the ego vehicle.

8. The non-transitory computer-readable medium of claim 7, in which the program code to bind the plurality of feature maps comprises program code to separate the moving objects from static objects in the plurality of feature maps based on the motion segmentation signal.

9. The non-transitory computer-readable medium of claim 7, further comprising program code to use motion supervision for training the attention model to assign the fixed set of slot variables, distinguishing a foreground of a sequence of video frames from a background of the sequence of video frames.

10. The non-transitory computer-readable medium of claim 7, further comprises program code to segment the objects discovered in the sequence of video frames.

11. The non-transitory computer-readable medium of claim 7, further comprises program code to track the objects discovered in the sequence of video frames.

12. The non-transitory computer-readable medium of claim 7, in which the program code to decode the combined feature map comprises program code to embed features within the reconstructed sequence of video frames.

13. A system of compositional feature representation learning for video understanding, the system comprising:

an individual feature map generation module to individually process a sequence of video frames received as an input of a feature map network to generate a plurality of feature maps;

an attention model to bind the plurality of feature maps to a fixed set of slot variables using the attention model according to a motion segmentation signal;

a combined feature map generation module to combine slot states corresponding to the fixed set of slot variables into a combined feature map;

an object discovery module to decode the combined feature map to form a reconstructed sequence of video frames, in which dynamic objects discovered in the reconstructed sequence of video frames are identified by 2D bounding boxes estimated from 2D instance masks estimated to focus on the dynamic objects discovered instead of non-dynamic objects in the reconstructed sequence of video frames; and a controller to control an ego vehicle to follow a planned trajectory adjusted for collision avoidance in response to the dynamic objects discovered in the reconstructed sequence of video frames in a scene captured by and surrounding the ego vehicle.

14. The system of claim 13, in which the attention model is trained to separate the moving objects from static objects in the plurality of feature maps based on the motion segmentation signal.

15. The system of claim 14, in which the attention model is further trained to assign the fixed set of slot variables, distinguishing a foreground of a sequence of video frames from a background of the sequence of video frames using motion supervision.

\* \* \* \* \*